United States Patent [19]

Cashwell et al.

[11] Patent Number: 4,536,919
[45] Date of Patent: Aug. 27, 1985

[54] BREAST PROCESSOR

[75] Inventors: Miles L. Cashwell, Marietta; Worthy D. Peterman, Cumming, both of Ga.

[73] Assignee: Cagles', Inc., Atlanta, Ga.

[21] Appl. No.: 476,799

[22] Filed: Mar. 18, 1983

[51] Int. Cl.³ .............................................. A22C 21/00
[52] U.S. Cl. ............................................. 17/11; 17/52
[58] Field of Search ................................ 17/11, 52, 61

[56] References Cited

U.S. PATENT DOCUMENTS

| | | | |
|---|---|---|---|
| 2,310,881 | 2/1943 | Swanson | 17/52 |
| 3,241,179 | 3/1966 | Schlichting | 17/52 |
| 3,264,681 | 8/1966 | Bartels | 17/52 |
| 3,518,718 | 7/1970 | Barefield | 17/52 |
| 3,639,945 | 2/1972 | Duncan et al. | 17/11 |
| 3,787,926 | 1/1974 | Schacht | 17/52 |
| 3,930,282 | 1/1976 | Martin et al. | 17/11 |
| 3,943,600 | 3/1976 | Cramer | 17/52 |
| 4,016,624 | 4/1977 | Martin et al. | 17/11 |
| 4,091,506 | 5/1978 | Soerensen et al. | 17/52 |
| 4,306,335 | 12/1981 | Hawk et al. | 17/11 |
| 4,365,387 | 12/1982 | Hartman | 17/52 |
| 4,373,232 | 2/1983 | Harding et al. | 17/11 |
| 4,395,795 | 8/1983 | Hazenbroek | 17/52 |
| 4,406,037 | 9/1983 | Hazenbroek | 17/11 |
| 4,424,608 | 1/1984 | Martin | 17/52 |

OTHER PUBLICATIONS

Foodcraft brochure, Catalog No. C-1082.
Food Craft Breast Processor, Model BP-1, Service Manual.

Primary Examiner—Nicholas P. Godici
Assistant Examiner—Kurt Rowan
Attorney, Agent, or Firm—Thomas & Kennedy

[57] ABSTRACT

A continuous conveyor assembly 11 comprises a plurality of conveyor plates 18 that define a longitudinal space 19 along the center portion of the conveyor. Carcass supports 21 are carried by the conveyor assembly at spaced intervals for transporting poultry carcasses 44. Breast support brackets 34 are mounted on the conveyor assembly adjacent each carcass support 21 for supporting the breast just above the conveyor assembly. The conveyor assembly carries the carcasses first through a pair of wing-cutting disks 48, then about a breast-cutting disk 51 that protrudes upwardly through the slot of the conveyor to cut the downwardly-facing breast of each carcass, and then through a back-cutting station 43 where the backbone is either split by a backbone cutter 62, or is cut from the carcass by a pair of spaced cutting disks 60 and 61. A guide 50 extends between the pair of back-cutting disks or about the backbone cutting disk to stabilize the carcass as the back is being cut.

3 Claims, 7 Drawing Figures

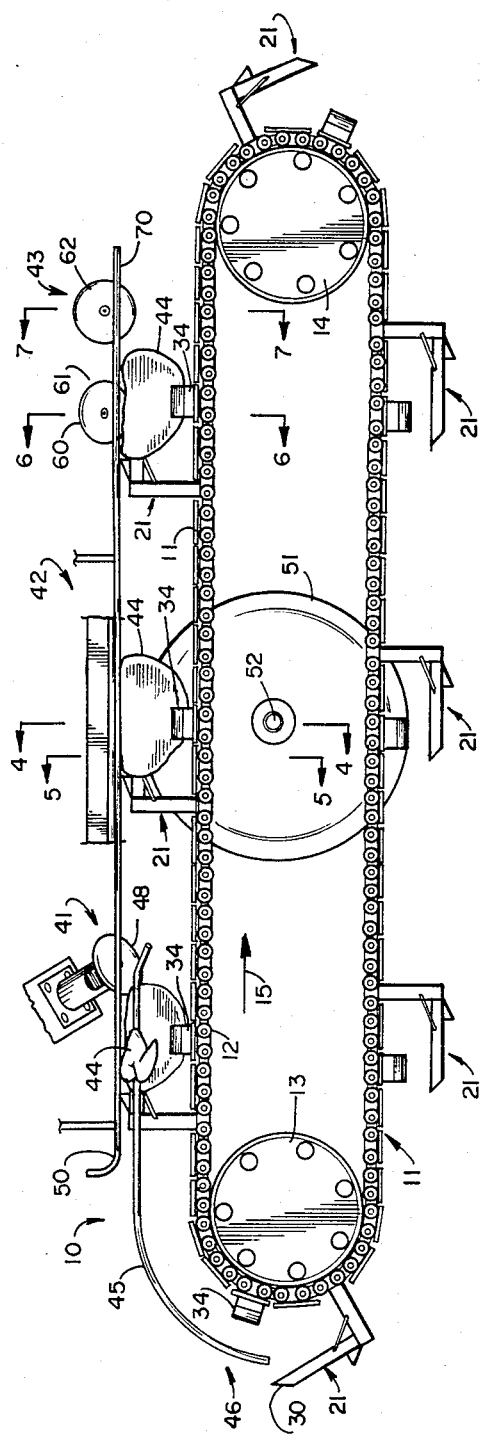
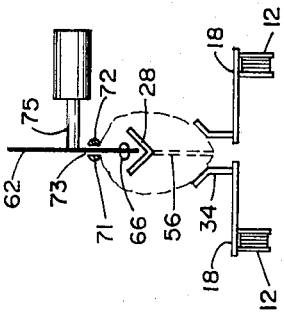
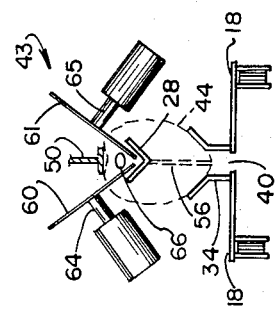
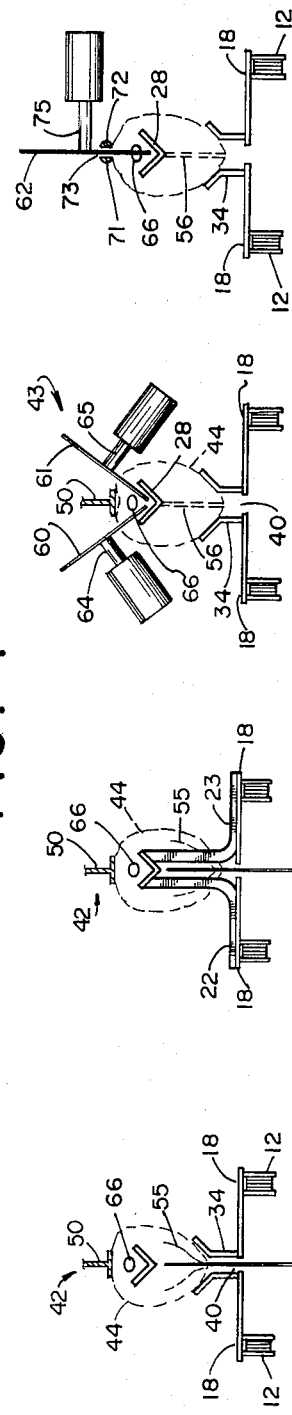
FIG. 1  FIG. 4  FIG. 5  FIG. 6  FIG. 7

BREAST PROCESSOR

BACKGROUND OF THE INVENTION

The disclosed invention relates to equipment for cutting apart poultry carcasses as the carcasses are moved in series while mounted on a carrier, and more particularly the invention relates to guide means and support means for properly positioning and stabilizing poultry carcasses as they are moved by a conveyor and are cut by cutting disks positioned in the path of the carcasses.

In the processing of poultry, birds are defeathered, eviscerated, and sometimes cut into parts as by removing the wings and legs, and cutting the carcass to separate the breast from the back, etc. Various cutting devices have been developed and utilized for performing these cutting functions. The cutting devices utilized to cut the wings and legs from the carcass are relatively simple in construction and reliable in operation because these poultry parts protrude from the carcass and can be guided and otherwise handled by automated equipment so as to position these parts in the proper attitude for cutting by a rotary knife or other cutting means.

When cutting the carcass or body of a bird, it is more difficult to form an accurate cut with automated equipment. Typically, the differences in size and shape of poultry carcasses cause the carcasses to be difficult to orient in the cutting equipment. One procedure for orienting a poultry carcass is to mount the cavity of the carcass on a carrier and move the carrier along a predetermined path through various cutting stations where rotary cutting blades or other cutting means cut into the carcass. Even with this type of carrier the poultry carcass tends to move on its carrier, thus requiring various external guide elements to maintain the poultry carcass in a proper position for cutting by the various cutting elements.

SUMMARY OF THE INVENTION

Briefly described, the present invention comprises an automatic poultry cutting device which carries a poultry carcass along a predetermined path and which removes the wings from the carcass, cuts longitudinally through the breast of the carcass so as to divide the breast in equal halves, and then cuts longitudinally through the back of the carcass so as to complete the longitudinal division of the carcass into halves. Carcasses are carried in series by a continuous conveyor system, by supporting each carcass on a carrier mounted to the conveyor, with the internal cavity of the carcass fitting about the carrier. Support brackets are also mounted to the conveyor at each carrier so as to engage and to support the downwardly-facing exterior breast surface of each carcass, so that the carcass is securely positioned on the carrier and does not tend to shift or move during the conveying and cutting steps. In addition, a longitudinal guide is positioned at the cutting station where the backs of each carcass are to be cut, so that the guide engages the exterior surface of the carcass about the backbone, thus firmly guiding the backbone through the back-cutting station.

The invention includes alternate back-cutting procedures. At one cutting station a pair of rotary disks are arranged in side-by-side relationship so as to cut just on opposite sides of the backbone so as to remove the backbone from the carcass. The backbone guide extends between the positions of the pair of cutting disks so as to firmly guide the backbone between the cutting disks. As an alternative, the pair of back-cutting disks can be removed, and a single backbone-cutter disk substituted therefor and positioned so as to cut directly through the backbone itself. The same longitudinal guide includes a bifurcated end portion that straddles the backbone cutter, so as to engage the exterior portion of the carcass about the backbone and to positively direct the backbone directly into the backbone-cutting disk.

Therefore, it is an object of this invention to provide guide and support devices that properly position and hold poultry carcasses as they are moved in series through various cutting stations in a cut-up machine, whereby the carcasses can be accurately cut to precisely divide the breast in halves and to precisely cut around or through the backbone of the carcasses.

Another object of this invention is to provide a breast processor which accurately divides the breasts of poultry carcasses in half as the carcasses are moved through various cutting stations.

Another object of this invention is to provide guide means for guiding the backbone of a poultry carcass as the backbone is carried on a conveyor into a backbone-cutting disk, so that the cutting disk accurately splits the backbone and otherwise cuts through the flesh and tissue of the poultry carcass.

Other objects, features and advantages of the present invention will become apparent upon reading the following specification, when taken in conjunction with the accompanying drawings.

BRIEF DESCRIPTION OF THE DRAWINGS

FIG. 1 is a schematic illustration of the breast processor, showing poultry carcasses as they are moved along the processing path through the wing-cutting station, breast-cutting station, and back-cutting station.

FIG. 4 is a schematic end elevational illustration of the poultry carcass as it is carried through the breast-cutting station, taken along lines 4—4 of FIG. 1.

FIG. 5 is a schematic illustration, similar to FIG. 6, but taken along lines 5—5 of FIG. 1.

FIG. 6 is an end elevational illustration of the poultry carcass carrier and a poultry carcass in dash lines as they pass through the back-cutting station, taken along lines 6—6 of FIG. 1, showing the back-cutting disks in relationship to the carrier.

FIG. 7 is an end elevational view of a carrier, similar to FIG. 4, but taken along lines 7—7 of FIG. 1, and illustrating the carrier as it passes through the back-cutting station and showing the backbone-cutting disk.

DETAILED DESCRIPTION

Figure 2:
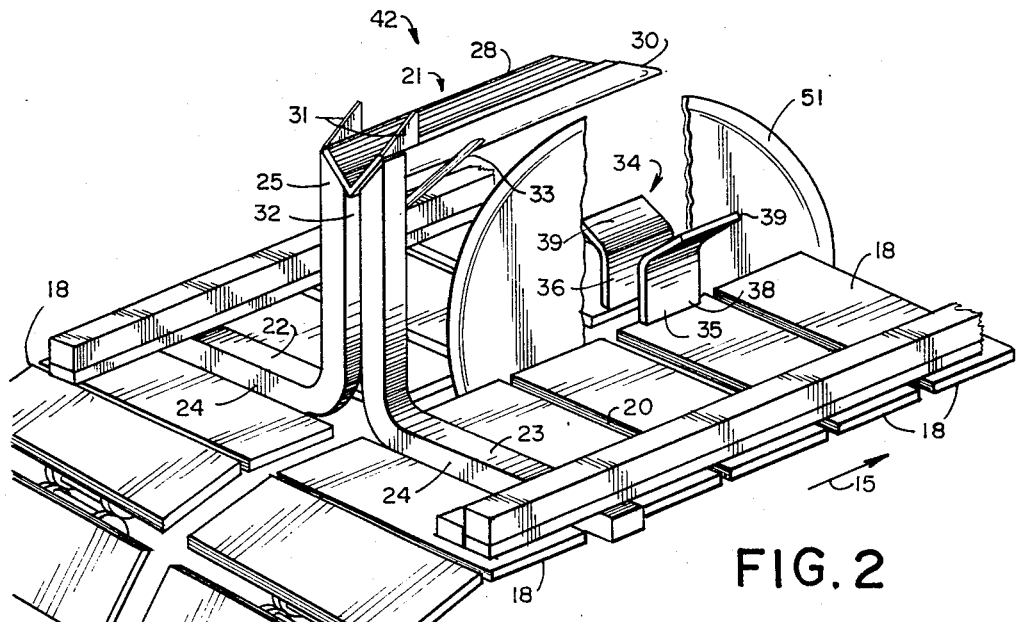
FIG. 2 is a detailed perspective illustration of a carrier and the conveyor as the carrier and conveyor pass about the breast-cutting disk.

Referring now in more detail to the drawings, in which like numerals indicate like parts throughout the several views, FIG. 1 illustrates in schematic form a breast processor 10 that comprises an endless conveyor assembly 11 which comprises a pair of conveyor chains 12 mounted in parallel, side-by-side relationship and extending about pairs of sprockets 13 and 14. The sprockets 13 are also mounted in parallel, side-by-side relationship as are sprockets 14, and the conveyor chains extend about and are driven in unison by the sprockets with the upper flight moving in the direction as indicated by arrow 15. A motor (not shown) drives one pair of sprockets 13 or 14, in the conventional manner.

Figure 3:
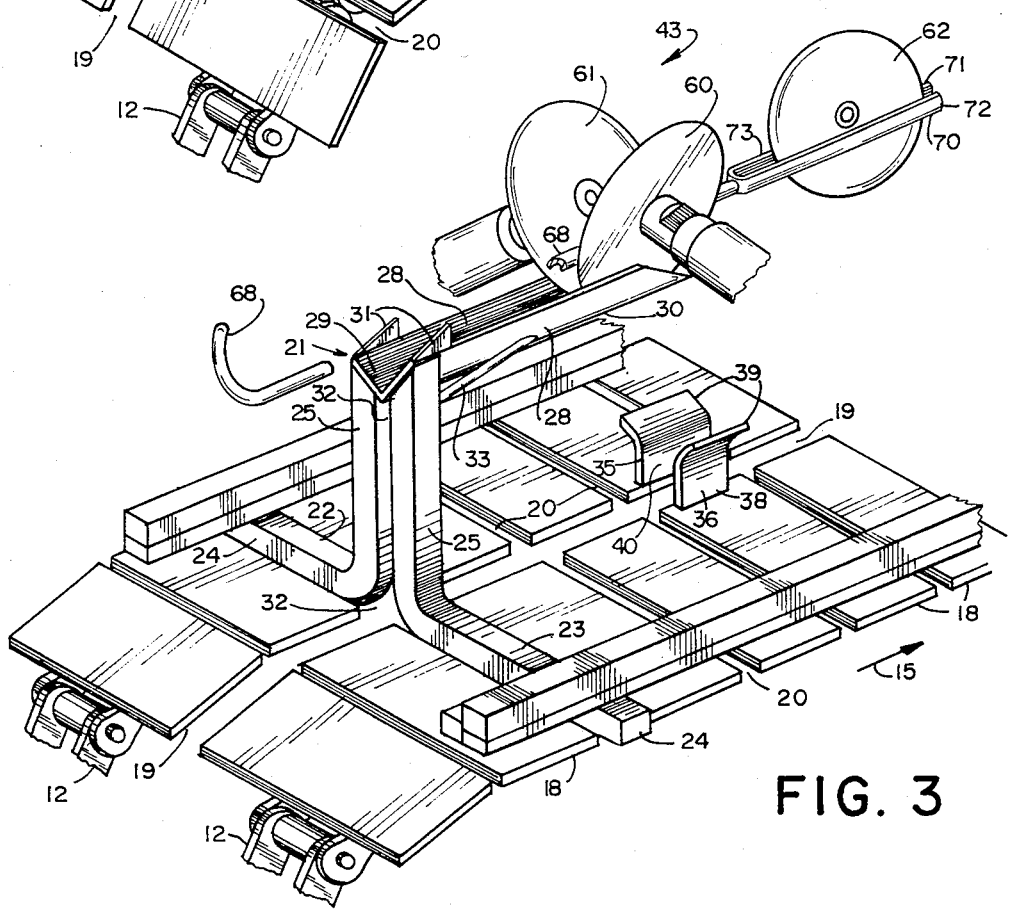
FIG. 3 is a detailed perspective illustration of a carrier and the conveyor as the carrier and conveyor pass through the back-cutting station.

As illustrated in FIGS. 2 and 3, a plurality of conveyor plates 18 are mounted to the conveyor chains 12, with each conveyor plate 18 being mounted to a link of a chain. The conveyor plates are approximately rectangular, with the conveyor plates 18 of one of the conveyor chains being spaced from the conveyor plates of the other conveyor chain and forming an endless slot or opening 19 along the length of the conveyor assembly. Also, lateral slots 20 are located between adjacent ones of the conveyor plates on a conveyor chain.

A plurality of carcass supports 21 are mounted in spaced series along the conveyor assembly 11. Each carcass support comprises a pair of L-shaped support brackets 22 and 23, each of which includes a horizontal leg 24 and a vertical leg 25. The horizontal legs 24 are positioned in a lateral slot 20 between adjacent conveyor plates 18 and are rigidly mounted to the upper surface of a chain link of a conveyor chain 12 and the vertical legs of each L-shaped bracket are spaced across the longitudinal slot 19, so that the pairs of support brackets 22 and 23 straddle the longitudinal slot 19. V-shaped carcass support bar 28 is mounted at its base end 29 to the upper ends of the vertical legs 25 of the pair of support brackets 22, with its distal end 30 extending from the pair of support brackets 22 in the direction of movement of the conveyor assembly, as indicated by arrow 15. The carcass support bar 28 is V-shaped in cross-section and includes a pair of positioning tabs 31 mounted to its side surfaces and projecting upwardly therefrom, and with support braces 34 extending from each L-shaped support bracket 22 to the lower side surface of the support bar 28. With this arrangement, a rigid connection is made between some of the links of the parallel conveyor chains 12 through the carcass supports 21, and the carcass supports 21 each define an upwardly-extending space 32 positioned vertically above the longitudinal slot 19.

As illustrated in FIGS. 2 and 3, a breast support bracket 34 is located adjacent and beneath the carcass support bar 28 of each carcass support 21. The breast support brackets 34 each comprise a pair of bracket plates 35 and 36 having a lower end portion 38 rigidly attached to the upper surface of a conveyor plate 18 and extending vertically from the conveyor plate, and an upper end portion 39 which diverges upwardly and laterally away from the opposite bracket plate, so that the upper end portions of each breast support bracket 34 form downwardly and inwardly converging surfaces for receiving the exterior breast surface of a poultry carcass that is mounted on a carcass support 21. The bracket plates 35 and 36 also straddle the longitudinal slot 19 of the conveyor assembly 11 and form an upwardly-extending space 40 therebetween.

As illustrated in FIG. 1, the breast processor 10 includes a series of work stations, such as wing-cutting station 41, breast-cutting station 42, and back-cutting station 43. Poultry carcasses 44 are to be mounted on the carcass supports 21 at the loading station 46 adjacent the sprockets 13, so that as the carcasses are moved by the conveyor assembly 11 through the cutting stations, the carcasses will be cut. Because of the curvature of the conveyor assembly 11 about the sprockets 13 at the loading station 46, the distal end 30 of the carcass support bar 28 is spread away from its breast support bracket 34 so that the breast support bracket is not likely to interfere with the mounting of a carcass on the carcass support; however, when the carcass support 21 is moved on about the sprockets and reaches the upper flight of the conveyor assembly the distal end of the carcass support bar and the downwardly facing breast of the bird will be moved further toward the support bracket 34, with the weight of the carcass tending to be supported both by the carcass support bar and the support bracket.

A pair of wing guide bars 45 extend from the loading station 46 to the wing-cutting station 41, and a worker mounts a carcass on each carcass support 21 by inserting a cavity of the bird about the V-shaped carcass support bar 28, and moving the carcass onto the bar 28 until the carcass is prevented from moving further on the bar by the tabs 31. The worker places the wings outside of the wing guide bars 45, and as the carcass is then moved by the endless conveyor assembly 11, the bars 45 spread the wings apart from the carcass so that the wings are in the proper orientations for being cut from the carcass as the carcass approaches the wing-cutting station 41.

Guide rod 50 extends parallel to the upper flight of conveyor assembly 11 and is arranged to slidably engage the upper surface of each carcass 44 as the carcasses move through the cutting stations 41, 42 and 43. This engagement tends to urge each bird downwardly so that the back of the bird is seated on the carcass support bar 28 and the breast of the bird is seated in the breast support brackets 34.

A pair of rotatable wing-cutting disks 48 (only one shown in FIG. 1) are supported in wing-cutting station 41, with the disks 48 being located on opposite sides of the path of the carcass and at the end of wing guide bars 45. The cutting disks 48 are arranged to cut at the joint between the wings and the carcass, thereby cutting the wings from the carcass.

After the wings have been removed from the carcass, the carcass is transported by the conveyor assembly 11 to the breast cutting station 42. Rotatable breast-cutting disk (FIGS. 1 and 2) 51 is positioned below the upper flight of the conveyor assembly 11 and protrudes upwardly through the longitudinal slot 19 (FIG. 2), up toward and just short of the V-shaped carcass support bar 28. The cutting disk 51 is rotatably driven about its axle 52 by an hydraulic motor 54 (FIG. 4). When a carcass 44 is carried by the carcass support 21 over the breast-cutting disk 51, the disk cuts the carcass at the apex of its keel 55 (FIGS. 4 and 5). As shown in FIG. 5, the breast support bracket 34 stabilizes the carcass 44 so that the cutting disk does not tend to glance off the keel 55 and make an improper cut through the carcass. The breast support bracket 34 straddles the rotatable breast-cutting disk 51 and as the carcass 44 is moved further through the breast-cutting station, the L-shaped support brackets 22 and 23 move on opposite sides of the cutting disk 51 and carry the carcass on about the cutting disk. This results in the carcass being cut longitudinally through its breast, with the cut being formed as illustrated at 56 in FIG. 6.

As the carcass moves on beyond the breast cutting station 42 the breast support bracket 34 tends to hold the cut-apart breast together.

When the carcass is carried into back-cutting station 43, either the pair of back-cutting disks 60 and 61 (FIG. 6) or the backbone-cutting disk 62 (FIG. 7) will be in position at the back-cutting station. If the back-cutting disks 60 and 61 are mounted to the machine, the disks are mounted on upardly-sloped axles 64 and 65 (FIG. 6), so that the planes of the disks 60 and 61 form a V shape. The cutting peripheral edges of the disks are oriented so that they engage the upper surface of the carcass 44 on opposite sides of the backbone 66. Guide rod 50 is supported by the framework (not shown) of the machine and extends along the path of the carcass, with the distal end of the guide rod 68 extending between the cutting disks 60 and 61. The guide rod is located so as to engage the upper surface of the carcass 44 over the backbone 66, so as to press the backbone downwardly into the V-shaped recess of the carcass support bar 28, which tends to positively locate the backbone in the proper position precisely between the cutting edges of the cutting disks 60 and 61. When the carcass moves between the cutting disks 60 and 61, the disks make a precise cut on opposite sides of the backbone 66 inwardly to the cavity of the carcass, thereby cutting the backbone from the carcass. This also cuts the carcass in half so that the now-separated halves of the carcass are free to fall apart. The breast support bracket 34 tends to hold the carcass together as the conveyor advances, until the carcass is dumped off the end of the conveyor.

In the event that the back-cutting disks 60 and 61 are not mounted to the machine and the backbone-cutting disk 62 is mounted to the machine, the backbone-cutting disk 62 is located further along the path than the back-cutting disks 60 and 61. The guide bar 50 includes a bifurcated end portion 70 (FIG. 1) with tines 71 and 72 that form a slot 73 therebetween. The tines 71 and 72 (FIG. 7) straddle backbone-cutting disk 62. Backbone-cutting disk is mounted on horizontal axle 75 so that the disk is oriented in a vertical attitude that extends downwardly between the bifurcated end portion 70.

As a carcass 44 moves toward the backbone-cutting disk 62, the tines 71 and 72 of the bifurcated end portion of the guide bar 68 tend to ride on opposite sides of the backbone of the carcass, thereby locating the backbone in the slot 73 between the tines. Since the backbone-cutting disk 62 also is located between the tines in the slot 73, the backbone will be moved directly into the backbone-cutting disk disk 62, so that the cutting disk longitudinally severs the backbone of the carbass. In the meantime, the V-shaped carcass support bar 28 passes beneath the backbone-cutting disk 62, and the concave recess accommodates the cutting edge of the backbone-cutter 62, permitting the backbone-cutting disk 62 to completely cut through the backbone. In the meantime, the breast support bracket 34 stabilizes the lower cut-apart portions of the breast of the carcass so that the action of the backbone cutter against the carcass does not tend to jar the carcass to an improper position on the carcass support. In addition, the breast support bracket 34 tends to hold the carcass together as the carcass moves away from the backbone-cutting disk 62, so that the carcass tends to move with the conveyor assembly 11 off the end of the machine.

While this invention has been described in detail with particular reference to a preferred embodiment thereof, it will be understood that variations and modifications can be effected within the spirit and scope of the invention as described hereinbefore and as defined in the appended claims.

I claim:

1. In apparatus for cutting poultry carcasses into segments including a surface conveyor for movement along a predetermined path comprising parallel conveyor halves which define a space therebetween, a plurality of carcass supports mounted at intervals along said conveyor for carrying poultry carcasses along the path, each of said carcass supports including a carcass support bar extending along said path, said carcass support bar being approximately V-shaped in cross section whereby the previously eviscerated carcass of a bird is mounted on a carcass support with the carcass support bar extending into the eviscerated cavity of the bird and the back bone of the carcass is supported by the V-shaped carcass support bar, a cutting station positioned along the path including a rotatable backbone-cutting disk for cutting longitudinally through the backbones of carcasses, said backbone cutting disk being positioned above the path and located in a plane parallel to the path and extending toward the path of the carcass support bar for cutting the backbone of a carcass, the improvement therein of backbone guide means extending on opposite sides of the backbone-cutting disk for bearing downwardly against the carcass on opposite sides of the backbone to press each carcass downwardly to urge the backbone of the carcass into the V-shaped carcass support bar and to guide the backbone into the backbone-cutting disk, and a breast-cutting disk protruding upwardly through said space between said conveyor halves for engaging and cutting the carcasses moved by the conveyor, the improvement therein including a breast support bracket carried by said surface conveyor comprising a pair of bracket elements mounted on the conveyor halves at positions adjacent each carcass support and the bracket elements together forming a surface against which the breast of a poultry carcass rests.

2. The apparatus of claim 1 and wherein the pairs of bracket elements include upwardly and outwardly diverging portions for receiving and supporting the downwardly-facing exterior surface of the breast of a poultry carcass.

3. The apparatus of claim 1 and wherein the breast-cutting disk and the backbone-cutting disk are aligned along the path with the breast-cutting disk extending upwardly into the path and with the backbone-cutting disk extending downwardly into the path, the improvement therein of said backbone guide means supported adjacent the path and located in the path prior to the backbone-cutting disk and having a bifurcated distal end portion defining a slot therebetween with the tines of the bifurcated end portion extending about said backbone-cutting disk, whereby the tines tend to urge the backbone of a carcass toward the slot between the tines and toward the V-shaped carcass support bar and guide the backbone toward the backbone-cutting disk.

* * * * *